United States Patent [19]
Hausammann et al.

[11] Patent Number: 5,319,565
[45] Date of Patent: Jun. 7, 1994

[54] DEVICE FOR GENERATING AND PROGRAMMING STITCH PATTERNS

[75] Inventors: Erich Hausammann, Ermatingen; Karl Nufer, Steckborn, both of Switzerland

[73] Assignee: Fritz Gegauf AG, Steckborn, Switzerland

[21] Appl. No.: 888,651

[22] Filed: May 27, 1992

[30] Foreign Application Priority Data

Jun. 10, 1991 [CH] Switzerland .............. 01731/91

[51] Int. Cl.$^5$ .............. G06F 15/46; D05B 21/00
[52] U.S. Cl. .............. 364/470; 112/121.12; 112/458; 364/188
[58] Field of Search .......... 364/470, 400, 191–193, 364/188, 189; 112/103, 266.1, 121.11, 121.12, 453–458, 444, 445; 340/716; 395/153, 161, 140–143; 345/1, 4, 5, 115, 116

[56] References Cited

U.S. PATENT DOCUMENTS

| | | | |
|---|---|---|---|
| 4,429,364 | 1/1984 | Maruyama et al. | 364/400 |
| 4,446,520 | 5/1984 | Shigeta et al. | 364/470 X |
| 4,648,341 | 3/1987 | Kato et al. | 112/458 |
| 4,856,104 | 8/1989 | Stoll et al. | 364/470 |
| 4,860,678 | 8/1989 | Skogward | 112/445 |
| 4,953,485 | 9/1990 | Brower et al. | 112/266.1 X |
| 4,960,061 | 10/1990 | Tajima et al. | 112/445 X |
| 4,998,489 | 3/1991 | Hisatake et al. | 112/103 |
| 5,005,500 | 4/1991 | Kato et al. | 112/121.12 |

FOREIGN PATENT DOCUMENTS 0418643 3/1991 European Pat. Off. .

*Primary Examiner*—Joseph Ruggiero
*Attorney, Agent, or Firm*—Richard Linn

[57] ABSTRACT

A device for the quick and uncomplicated design of any sewing pattern or embroidering pattern permits creation of a raw draft of the pattern (11) on a graphic display (8). The raw draft is stored and the stored shape is used as a basis for elaboration and adaptation to the realization by the sewing machine. The elaboration and transformation into stitch sequences is also performed on an appropriate display (10), with the raw draft being displayed in the manner of a background. The transformation into individual stitches necessary during the editing process is largely automated by different auxiliary functions without excluding manual corrections.

19 Claims, 4 Drawing Sheets

DEVICE FOR GENERATING AND PROGRAMMING STITCH PATTERNS

FIELD OF THE INVENTION

The present invention relates to a device for generating and programming self-made stitch patterns for a sewing or embroidering machine.

DESCRIPTION OF PRIOR ART

The following methods and devices for producing personal stitch pattern creations by the operator of a sewing machine are known in the art.

A first method or device has an input of stitch coordinates by matrix panels which are either formed of directly actuatable switches, such as that in U.S. Pat. No. 4,144,827 to Singer, or comprise switching points, which have to be activated using a setting stylus such as that in U.S. Pat. No. 4,142,472 to Yamamoto. The stitch data corresponding to the coordinate points on the panel are stored in a stitch pattern memory and serve for the control of the sewing tools of a sewing or embroidering machine in order to produce the desired stitch pattern.

A stitch pattern input of this kind is awkward and complicated. The use of some auxiliary device is required for the operator in order not to lose the overview of the input operation and for a correct input sequence of the commands for forward or backward feed. The procedure is particularly difficult according to U.S. Pat. No. 4,142,472 because the data for fabric forwarding and returning have to be entered into separate matrix panels. For the input of simple stitch patterns, e.g. variations of zigzag stitches, or of so-called utility stitches, this kind of input facilities may be roughly sufficient. Many users, however, might have difficulties or even be unable to operate the device.

A second method or device has an input of stitch coordinates in the form of digital data words. The data words for lateral needle displacement and forward or backward transport of the sewn material are entered using an external pattern panel or an input device for digital signal, such as that in U.S. Pat. No. 4,092,938 to Singer.

This entering facility for self-made stitch patterns is also uncomfortable and time consuming. Mistaken entries are virtually preprogrammed. An input by means of the pattern panel according to FIG. 7 is somewhat simpler, but the latter also is only appropriate for the input of relatively simple zigzag patterns.

A third method or device has an input Input of stitch coordinates and further operational informations which are important for the production of a stitch pattern by a contact stylus and an input plane, a so-called coordinate input unit such as that in U.S. Pat. No. 4,429,364 to Mitsubishi. The input plane is divided into a function input section and a pattern input section. The command data which are necessary for the production of a pattern, such as the stitch length, the magnifying factor, etc., are determined by entering the corresponding control commands by activating the digital displays by means of the pattern. The pattern then drawn by progressively entering the locations of the needle stitches on the coordinate input unit. This drawing procedure may be followed on a monitor where the entered command data are visible as well.

This input facility for a control program for the production of a sewing pattern is intended for the manufacture of component parts of garments by means of automatic sewing machines. The input procedure is laborious and requires a technically skilled operator in spite of the relatively simple sewing patterns being programmed. Under certain conditions, such an input facility might be appropriate for programming simple zigzag or ornamental stitch patterns, but it is less suited to programming such pictorial stitch patterns as may be produced on a sewing machine having a controlled lateral transport or a controlled embroidering frame.

A fourth method or device has an input of control informations into an external storage device for the control of the embroidering frame of an automatic embroidering machine such as that in U.S. Pat. No. 4,290,375 to Janome, a handpiece connected to a HF generator, and a panel for determining the coordinates being provided as an input device.

An additional input device which is distinct from the sewing machine is thus needed to produce self-made sewing or embroidering patterns. The stitch pattern coordinates are recorded on a data medium which is inserted into a reading device connected to the sewing machine. Besides the fact that household sewing machines do not usually comprise any facilities for receiving external data media, the purchase of a special coordinate input and digitizing device is quite costly and does not appear to be reasonable for an occasional use.

In addition to the mentioned drawbacks, all the cited methods and devices for the production of self-made stitch pattern creations have the common disadvantage that generating and programming pictorial stitch patterns according to one's own imagination is extremely difficult. The programming is therefore usually effected with the help of model patterns, e.g. sewing patterns, cartoons, etc. Yet, even so, the "free handed" programming of one's own creations requires an extraordinary sense of imagination, very good drawing skills and moreover a steady hand; i.e. conditions which are generally met by experienced persons only.

SUMMARY OF THE INVENTION

The device of the invention essentially simplifies the creation and the programming as well as the realization of individual sewing or embroidering patterns. These sewing patterns or embroidering patterns are produced in at least two phases. In a first step, the desired pattern is drafted on a suitable monitor in a known manner by means of a mouse, a trackball, or a joystick in connection with a cursor moving on the screen, or directly on the screen by use of a screen-position sensitive pen. The stitch coordinates are stored in an intermediate memory.

In a second step, the pattern on said screen is elaborated, brought to its final form, and the stitch sequence, stitch distances etc. are determined. This editing process may either be effected on the hand-entered stitch pattern, or the hand-sketched stitch pattern may be recalled from said intermediate memory and transferred for a better overview to a second screen which is especially suited to the editing of the pattern. The operator may refer to the unchanged manual sketch of the pattern at any time of the process since the edited pattern is overlaid, so to speak, over the hand-made pattern and thereby serves as a raw model on the second screen.

The final editing of the pattern is now advantageously effected by means of a mouse, a trackball or a joystick. However, a coordinate input by a keyboard would be possible as well. In the process, the cursor moving on the screen is first positioned on the coordinate point which is to be the starting point of the stitch pattern. This point is fixed by a click, i.e. by actuating the key provided therefor. The editing and programming of the final pattern may then proceed after the desired stitch length has been preselected using the normal manual setting device for stitch length adjustment of the machine. The preliminary contour lines of the manually entered pattern are now finally determined stitch by stitch, the setting key which is associated to the cursor and the trackball remaining pressed until the next stitch location of the needle is determined. As soon as the key is released, the next point is fixed. In this context, it is particularly advantageous that the somewhat thicker connecting line between the sequence of points is freely movable from the last fixed point in any direction according to the cursor movement, like a loose thread, and is only determined when the following stitch point is set by releasing the setting key. In this manner, the operator is able to visualize the path of the thread from one stitch point to the next one. The maximum length of the connecting line corresponds to the preset stitch length, except if the next stitch point should lie outside the predetermined boundaries of the embroidering surface. In this case, the length of the connecting line is reduced to the distance between the last set stitch and the boundary line.

In order to simplify the input of stitch points on straight lines or on circle lines, it is sufficient to enter the starting and end points of straight lines or the starting and end points as well as the arc height of circle line sections, respectively, in order to determine a corresponding stitch sequence on the defined line. The distance between the starting and end points of the straight lines or of the circle line sections is divided into an integral number of stitch points whose mutual distances are approximated to the preset stitch length. It is also possible, however, to draw "connecting threads" between two points without forming stitches therebetween.

When sewing completely distinct pattern portions, connecting threads are inevitable. If these threads disturb the appearance of the pattern, they may be removed by a cutting instrument. The starting and end points of patterns or of pattern portions are advantageously specially marked, e.g. with an input key, so that the machine will sew several binding stitches at these points. As soon as the edited stitch pattern is completely entered, it is finally stored, and the manually sketched stitch pattern in the intermediate memory may be deleted.

A corresponding extension of the processor power and of the memory facilities would also allow to fill certain closed sections of the pattern with so-called caterpillar seams in order to obtain a more plastic appearance of the stitch pattern. Furthermore, a color changing device might be provided in order to allow the production of multicolored sewing patterns.

Of course, all the usual techniques and auxiliaries are applicable at least in the second phase of the input of sewing and embroidering patterns, such as, e.g., mirroring or lengthwise and transversal displacement, magnification ("zooming") of a determined detail, rotation around a certain point of reference, pattern repetition, register prolongation in band patterns, combination of individual patterns or of parts of patterns, superimposition of different, e.g. symmetrical patterns from a common point of reference, and also with different colors, temporary disengagement of the needle bar for effecting overlong stitches, and further usual functions.

BRIEF DESCRIPTION OF THE DRAWINGS

Other advantageous properties are set out with reference to an embodiment which does not limit the scope of the invention. In the drawings.

DETAILED DESCRIPTION OF THE PREFERRED EMBODIMENT

Figure 1:
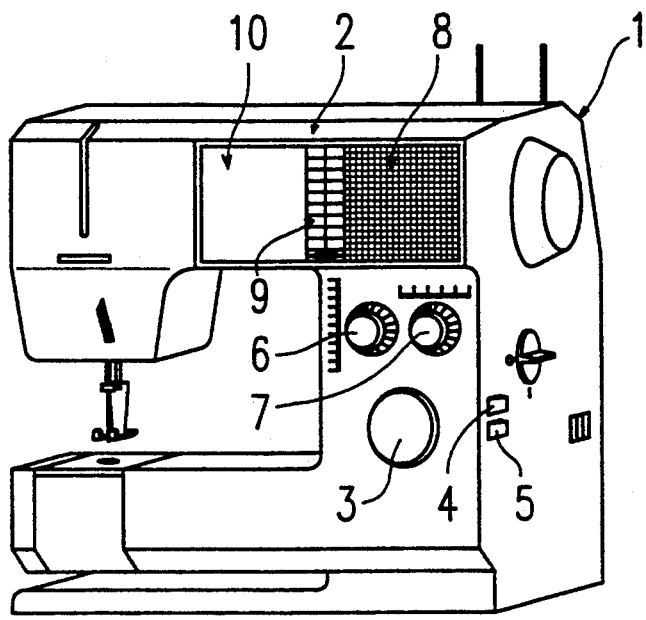
FIG. 1 shows a sewing machine with an integrated drafting unit.

FIG. 1 shows an electronically controlled sewing machine 1 with drafting unit 2 which is integrated into the housing. Also provided are a trackball 3 as well as two input keys 4 ("OK") and 5 ("CLR"). OK key 4 generally serves to start a function at the location of the trackball-controlled cursor. CLR key 5 generally cancels the latest action triggered by key 4. Further linked to the drafting unit are in particular the settings for stitch length 6, stitch width 7 and the non-represented device for starting the sewing or embroidering process, usually in the form of a foot pedal. The remaining devices and operating elements are conventional ones and are not relevant for the description of the invention.

Figure 2:
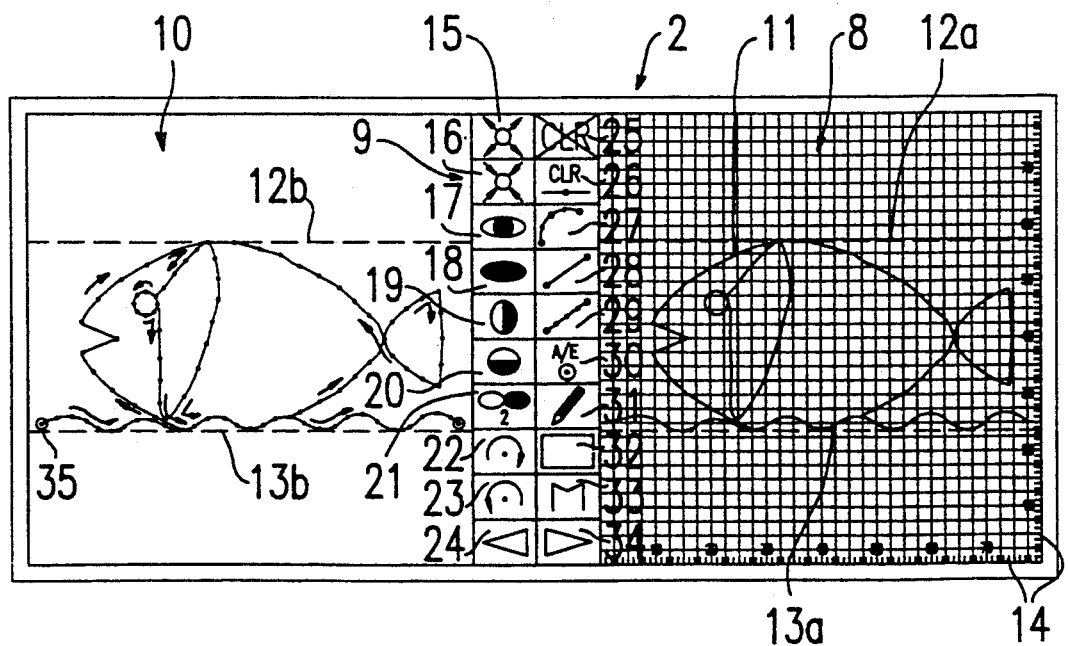
FIG. 2 shows a top view of the drafting unit display in about its natural size.

FIG. 2 shows a schematical top view of the drafting unit. It consists of the display 8 for the draft, a centrally disposed menu bar 9, and the final pattern display 10. Liquid crystals are a common technology for displays of this kind. For obvious reasons, the displays show a magnification of the drafted patterns. An item of the menu bar is chosen and the corresponding function is carried out, as far as possible in the respective operational status, by moving the cursor to the corresponding function field using the trackball 3 and by actuating the OK key 4.

Besides a sewing pattern 11, here in the form of a fish, the draft display 8 shows auxiliary lines 12a and 13a which designate the maximum lateral displacement of the needle, as well as a grid and lateral grid scales 14. It is not possible to draw past auxiliary lines 12a and 13a. The entire surface of the display can be utilized if a controllable embroidering frame and a laterally displaceable fabric guide are present or supplemented, whereby said auxiliary lines are no longer displayed. For the draft of the pattern, the dimension of the display and, as the case may be, the greatest possible needle lateral displacement, constitute the pattern boundaries to which all drafting facilities are limited.

The pattern 11 is first produced on the draft display 8 in the manner of a free-hand drawing by the trackball. The display 8 is activated by choosing menu item 34 of the menu bar, i.e. "activate right-hand display" and, if an image 11 was present beforehand, by deleting the same by menu item 25, i.e. "delete contents of active display." If it is not deleted, the existing image may be improved or extended. Modifications of the draft are at all times stored in the memory which is assigned to the pattern. On the other hand, the draft, which serves as an editing help, is only transferred to final pattern display 10 after choosing function 24, i.e. "activate left-hand display." A previous draft which is possibly displayed on this display is automatically deleted beforehand. An already existing final pattern based upon an older draft is only removed by menu item 25, i.e. "delete contents of active display," while the displayed draft is conserved.

By choosing menu symbol 30, i.e. "beginning end," the draft is now traced by individual stitches beginning at starting point 35, imperfections of the draft being corrected. In the simplest case, a straight line is defined by its starting and end points after choosing menu item 29, the drafting unit automatically replacing the line with identical stitches whose maximum length is set by stitch length dial 6. The starting point is defined by moving the cursor to the desired position by actuation of trackball 3 and by pressing OK key 4 and holding it down. The cursor is moved to the position of the end point of the stitch and the OK key 4 is released, whereby the line is determined. As long as the starting point is defined, but not the end point, a line is continuously displayed which runs from the starting point to the cursor. By selecting menu symbol 28, i.e. "straight line without intermediate stitches," a line without a division into stitches may be generated in order to produce a connecting thread. The end and the beginning of a pattern or of a pattern section may be marked by selecting "beginning/end point" 30, whereby a sequence of fastening stitches is automatically performed at these locations.

Circle arcs can be generated by selecting menu item 27, i.e. "circle arc." The circle arc is defined by three points with the cursor and a short actuation of the OK key 4.

Finally, it is also possible to determine individual stitches by choosing menu item 31. The function is similar to drawing a connecting thread, the length, however, being limited to the preset stitch length. This maximum length is e.g. indicated by a circle around the location of the starting stitch. Parts of the circle line may be cut off if the circle extends over set boundaries, such as auxiliary lines 12b and 13b, and are then replaced by corresponding chords. This limitation of the graphic functions to the boundaries given by the machine represents an important help for the design of the patterns.

In addition to the physically determined pattern limits, e.g. on account of the maximum lateral needle amplitude, the user may install an additional frame by choosing menu item 32, i.e. "frame." The frame may be moved inside the above-mentioned boundaries and also limits all further drawing functions. The frame is advantageously used for the design of monograms in order to ensure characters of the same size. The frame is activated by selection of menu item 32 and actuation the of OK key 4 and indicated on the presently active display 8, 10. As long as no other menu function is selected, the frame may be manipulated in the following manner: when the cursor is placed in the frame and the OK 4 is pressed, the frame will follow the cursor inside the pattern limits 12,13 as long as the OK key 4 remains pressed. On the other hand, if the cursor is placed outside the frame and the OK key is actuated, the nearest corner of the frame will be moved to the present cursor position or as close to that position as allowed by the pattern limits. If the cursor is placed upon menu item 32 and CLR key 5 is actuated instead of the OK key 4, the representation of the frame is removed from the display and its limiting effect is cancelled; the position and the extension of the frame remain conserved, however.

The entire pattern may be mirrored in the sewing direction with "forward mirroring" 19 and transversally thereto with "lateral mirroring" 20, subjected to "pattern elongation" 17 and "pattern shortening" 18 with constant stitch lengths, to "pattern enlargement" 15 and "pattern contraction" 16, "rotation to the right" 22 and "rotation to the left" 23, continuously or in units of e.g. 10°, "pattern repetition" 21 with repetition factors between 1 and 9, "delete pattern in active display" 25 and "delete one stitch" 26 by selection in the menu. The figure displayed in the menu item "pattern repetition" 21 indicates, for example, that the pattern is sewn twice, whereupon the machine stops automatically. The figure is incremented by 1 each time the OK key 4 actuated while the cursor is placed on this menu item, and decremented by 1 when the CLR key 5 is actuated. A repetition factor 0 corresponds to an unlimited repetition of the presently displayed pattern.

The finished final pattern is memorized by the selection of "store" 33 and may be recalled and sewn by means of the commonly used foot pedal, the course of the sewing operation being preferably indicated on the display 10.

Figure 3A:
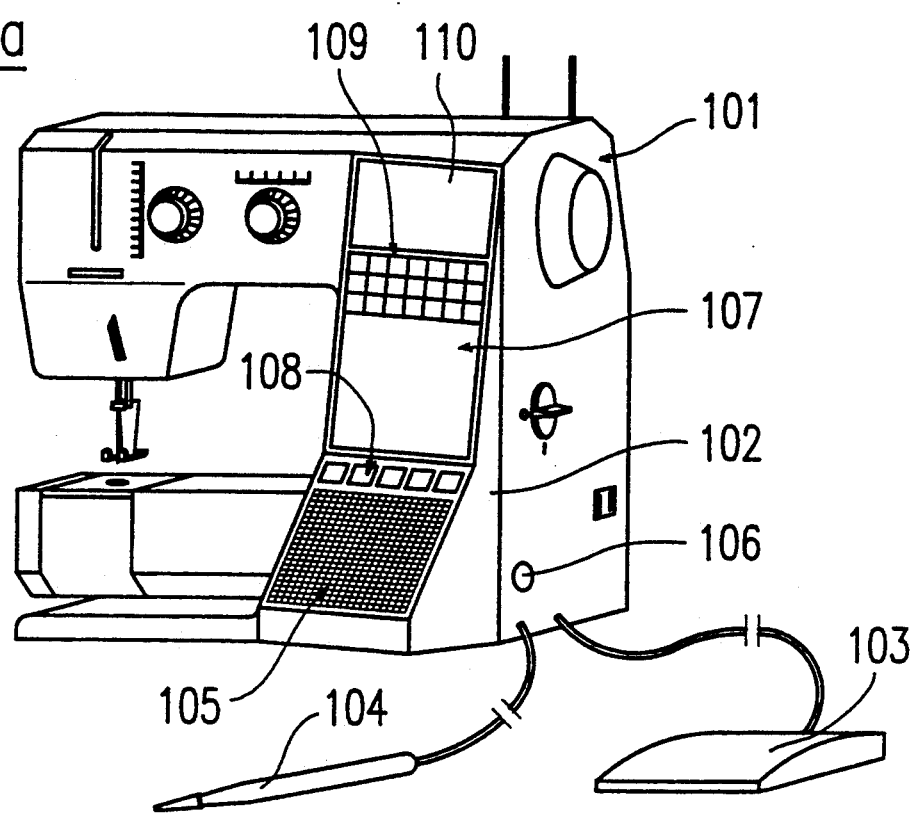
FIGS. 3a and 3b show a second embodiment of the invention.
Figure 3B:
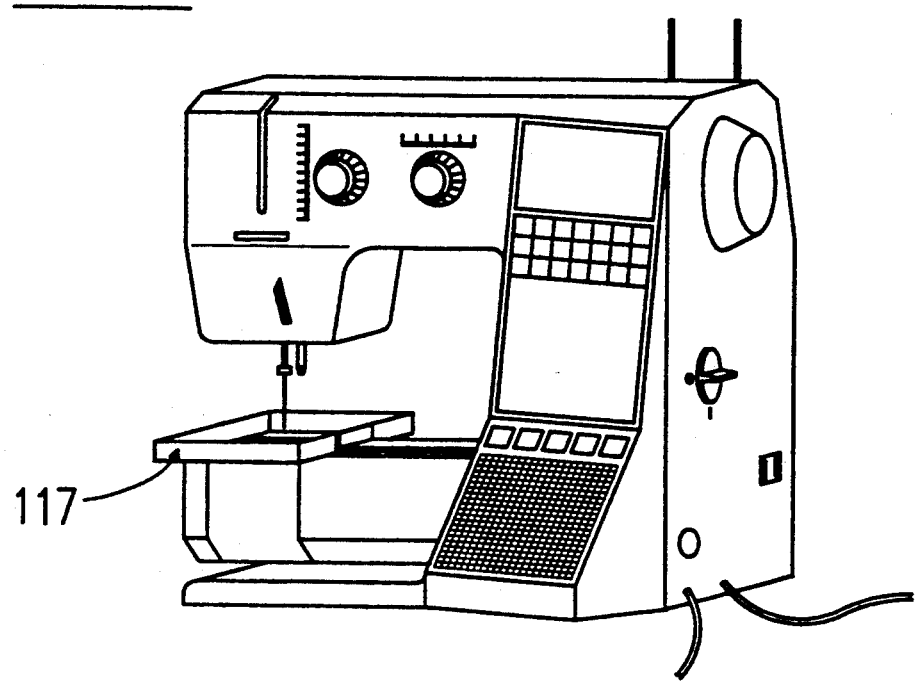
Figure 4:
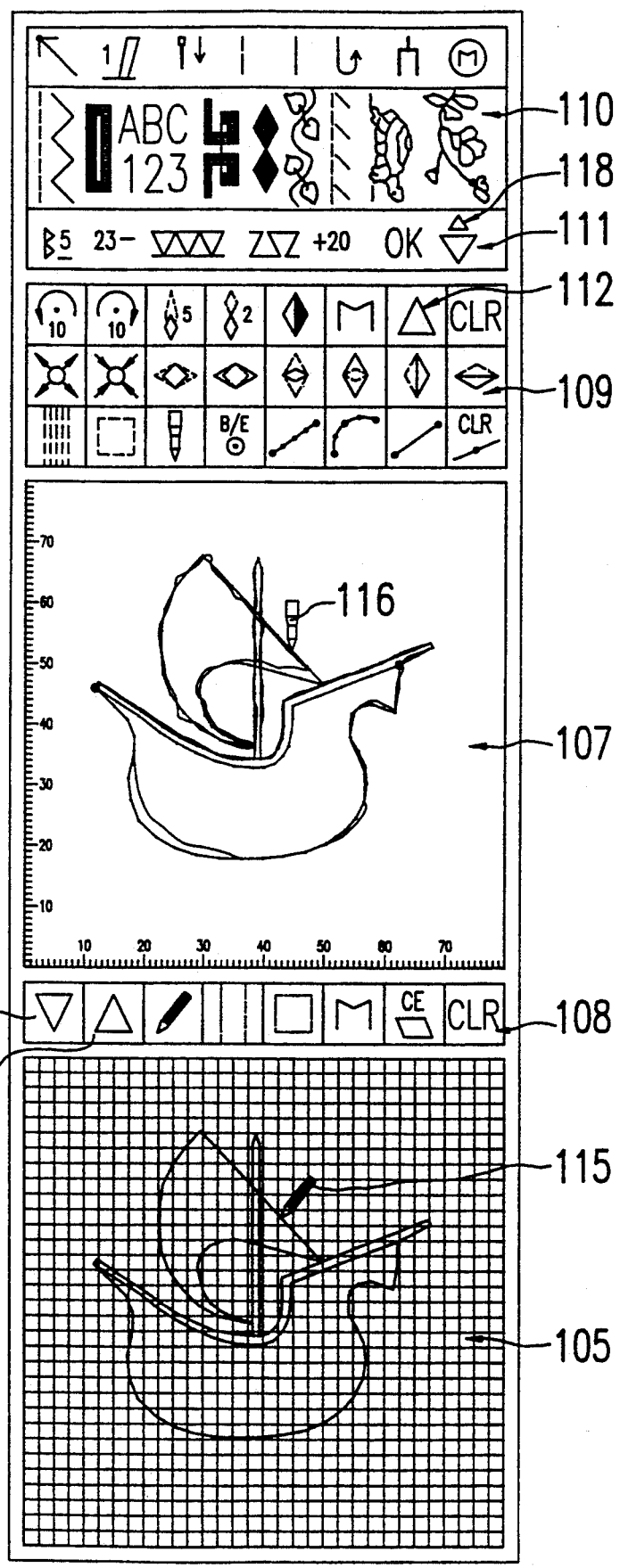
FIG. 4 shows a planar top view of the drafting device of FIGS. 3a and 3b.

FIG. 3 shows another embodiment of a sewing machine 101 having a pattern drafting unit 102. FIG. 3a shows a trackball 103 connected to the machine by a cable as well as a stylus 104 which serves for the input of the drafts by means of draft display 105 in the form of a digitizing panel. Stylus 104 is stowed away in stylus pocket 106 when it is not being used. The display of the drafting unit is shown in FIG. 4 in a planar top view in about its natural size. The display 107 for the final pattern is disposed above draft display 105, and menu 108 for the control of the drafting unit is located therebetween. The graphic menu 109 is disposed above final pattern display 107, and thereabove, menu 110 for the selection of predetermined patterns as well as the usual control functions of a sewing machine. One particularity of this embodiment is the possibility of selecting a predetermined pattern from menu 110 and copying the same to final pattern display 107. Switching between the drafting unit 102 and standard menu 110 is effected by menu items 112, "activate standard menu," and 111, "copy selected pattern to drafting unit and activate drafting unit." Selection of 114, "activate final pattern display" and 113, "activate draft display" allows the user to switch between the two design modes.

Here, the production of the draft is particularly quick and uncomplicated by means of the digitizing stylus 104. Trackball 103 also allows the control of cursor 115 in the drafting phase, and furthermore the control of cursor 116, which is symbolized as a needle here, in the editing process of the final pattern, and the selection of all the displayed elements of menus 108, 109, and 110. The selection of predetermined patterns is effected by means of cursor 118 and by "scrolling" through standard menus 110 by means of arrow symbol 119. FIG. 3b shows a machine of this type with a controlled embroidering frame 117 which allows the utilization of the entire display surfaces 105 and 107 for the design of a pattern, whereas the greatest possible needle displacement transversally to the sewing direction limits the maximum width of the pattern in the machine according to FIG. 3a.

Figure 5A:
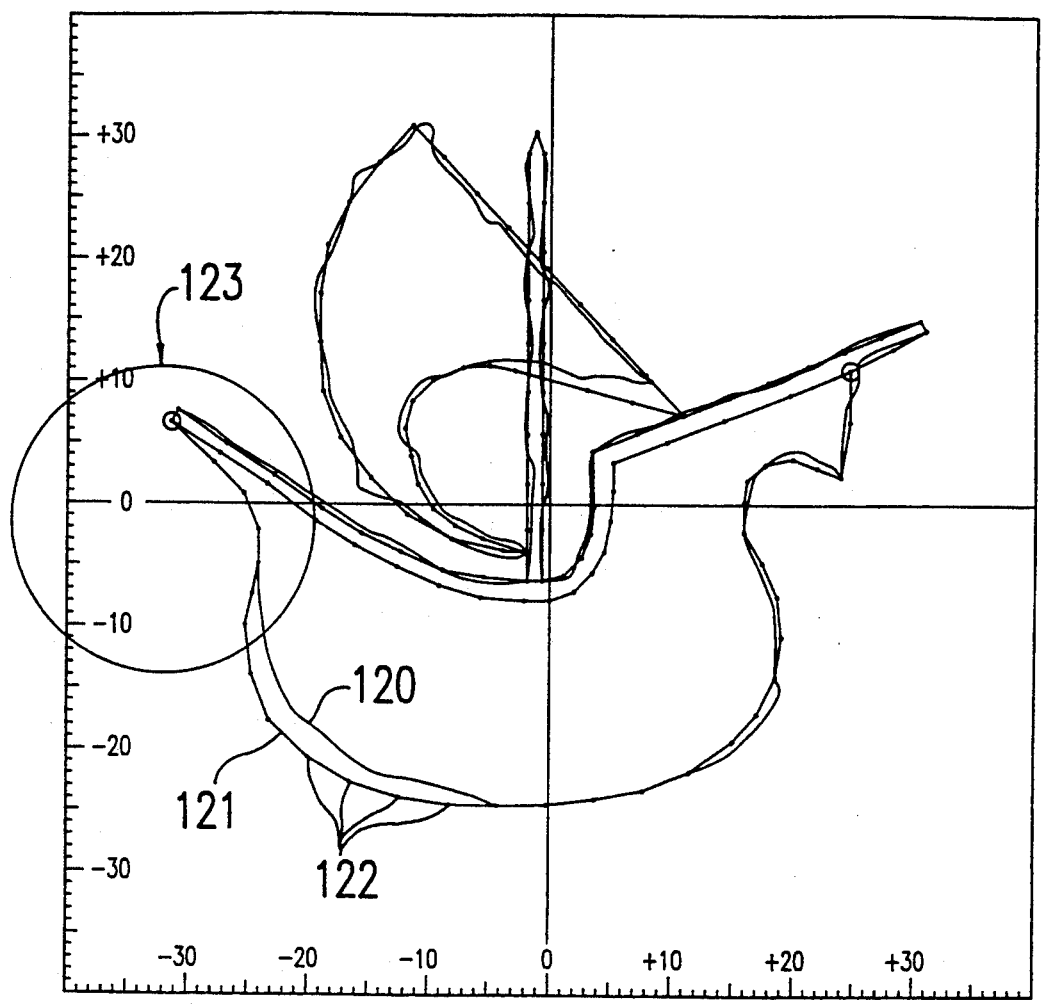
FIGS. 5a and 5b explain the functional principle of the editing section.
Figure 5B:
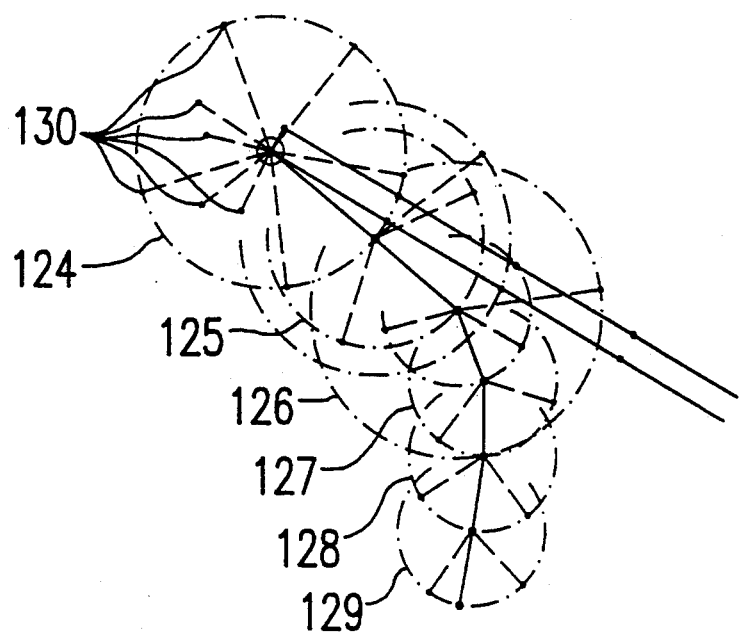

FIG. 5a is another illustration of the final pattern display on an enlarged scale. Line 120 is the free hand drawing which has been taken over from the draft display, and line 121 shows the final pattern with indicated stitch points 122. FIG. 5b again shows the procedure for the design of the final pattern more clearly by a magnification of the pattern section 123 which is encircled in FIG. 5a. The respective radii of circles 124 to 129 correspond to the actual stitch length, and some possible stitch end points 130 are indicated within the circle lines. In order to obtain a better approximation of the curved line, a smaller stitch length has been selected for stitches 127, 128 and 129.

Of course, other embodiment are possible within the scope of the inventive idea device and method. Several patterns may be designed consecutively and stored in respective memories. Subsequently, the patterns can be used individually or can be automatically performed one after another in an arbitrarily predeterminable sequence, each pattern within the sequence being repeated itself according to the repetition factor. A possible application thereof would be the design of monograms, for example. It is also advantageous to use a non-volatile memory in order to keep the patterns available over a long period of time without the need to leave the machine constantly switched on. For the design of complicated patterns, a magnifier function may be provided, which represents an area on an enlarged scale and thus facilitates its elaboration.

Instead of two displays, a single display for both the draft and the final design may be provided as well. In this case, its function would be determined by a switching facility. For this purpose, it would be advantageous to use a menu function whose activating field indicates the actual status of the display simultaneously.

For the draft, as well as for the elaboration of the final pattern, further basic graphic functions may be provided, such as circle arcs having any angles and radii, ellipses, and filled surfaces, in particular rectangles. By using a lasso function, arbitrarily chosen sections might be marked and deleted, copied, displaced or multiplied.

The input of text or of figures might be enabled by an alphanumerical menu or by the connection of a keyboard. The text, e.g. a name, could then be further ornamented. A possibility for graphically designing one or several character sets of the machine is also conceivable.

The device might be provided with connecting facilities for an external memory, a computer, etc., in order to externally store or further edit the patterns, and/or to load patterns into the machine.

We claim:

1. A device for producing sewing or embroidering patterns, comprising:
    means for capturing a raw draft of a pattern in a digital form and for displaying said pattern on a first graphic display;
    means for storing said raw draft of said pattern and;
    means for modifying said raw draft, for transforming said raw draft of said pattern into a final pattern, and for displaying said final pattern on a second graphic display;
    wherein said final pattern comprises operational steps for controlling said device to produce said final pattern and said final pattern is continuously displayed on said second graphic display.

2. The device of claim 1, wherein said device is an integral component of a sewing or embroidering machine.

3. The device of claim 1, wherein said raw draft and said final pattern are displayed simultaneously on one display unit comprised of said first graphic display and said second graphic display.

4. The device of claim 1, wherein said raw draft is generated on said first graphic display unit and is permanently displayed; and
    wherein said second graphic display is for the display of said final pattern and has at least the same resolution as the first graphic display.

5. The device of claim 1, said capturing means comprises input means selected from the group comprising a mouse, a trackball, a rolling ball, a joy stick, a control stick, a keyboard, a digitizing panel with a stylus, and a touchscreen.

6. The device of claim 1, wherein commonly used graphic and technical functions are chosen from a menu, with said capturing means and are automatically transformed into said operational steps.

7. The device of claim 1, wherein at least a portion of said pattern is subjected to graphic transformations.

8. The device of claim 1, wherein an operational step comprises one stitch of a sewing machine whose starting point is either given by an end point of a previous stitch or is given by a user;
    an end point of said one stitch, with reference to said starting point, is confined to a circle whose radius is given by a user selected preset stitch length; and
    wherein said second graphic display displays said one stitch together with previously produced stitches so that the realization of said one stitch according to the status of said input device is continuously visible.

9. The device of claim 1, wherein the second graphic display for said final pattern illustrates the individual ones of said operational steps comprising said final pattern as said final pattern is to be sewn.

10. The device of claim 1, wherein said raw draft and said final pattern are stored in said device, are transferred from said device to another apparatus to allow storage on another data media, are input into other devices for re-entry into said device, or are a digital or an analog elaboration thereof.

11. The device of claim 1, wherein said device allows color changes within said final pattern.

12. The device of claim 1, wherein an operational sequence for a sewing or embroidering machine is automatically generated when contours of a surface area have been defined so that said surface area is respectively covered with seams or embroideries when said final pattern is sewn.

13. The device of claim 1, wherein a plurality of patterns are designed independently from each other, wherein said plurality of patterns are sewn one after another either consecutively in sequence, and wherein each of said plurality of patterns may be repeated within said sequence.

14. The device of claim 1, wherein said patterns are stored in alterable digital memories which are independent from an external current supply.

15. The device of claim 1, wherein at least some of a plurality of patterns stored in a memory are accessible to said means for modifying and for transforming.

16. The device of claim 1, wherein boundaries, for defining a working area for said raw pattern, are determined according to the limitations of a sewing or embroidering machine and are displayed on said first graphic display.

17. The device of claim 1, wherein a user selectable and displaceable frame limits the design of said raw draft to within said frame while said frame is enabled and wherein said frame is indicated on said first graphic display.

18. The device of claim 1, wherein an operational step comprises one stitch of a sewing machine whose starting point is either given by an end point of a previous stitch of is given by a user and an end point of said one stitch, with reference to said starting point, is set with said capturing means.

19. The device of claim 13, wherein said sequence is determined by a user.

* * * * *